3,194,754
CATALYTIC CONVERSION OF HYDROCARBONS
Frank C. Fahnestock, Roslyn Harbor, N.Y., assignor to Socony Mobil Oil Company, Inc., a corporation of New York
No Drawing. Original application Dec. 20, 1961, Ser. No. 160,904. Divided and this application Apr. 13, 1964, Ser. No. 359,484
7 Claims. (Cl. 208—120)

This application is a division of my pending application, Serial Number 160,904, filed December 20, 1961, now abandoned.

This invention has to do with a method for the optimum utilization of the high efficiency of a recently developed group of catalytic materials useful for the conversion of gas oils to gasoline.

At the present time, catalysts for the cracking of gas oils to gasoline are various forms of amorphous complexes of silica and alumina, frequently with minor additions of various metals, etc., for various purposes. As such materials, there are used pellets and granular materials of the nature of clays, acid-washed clays, co-precipitated complexes of silica and alumina, co-gelled complexes of silica and alumina, co-gelled complexes of silica and alumina in the form of beads, "microspheres," and the like. Typical of these is a specific bead-form catalyst, hereinafter spoken of as conventional catalyst, which is produced by co-gelation, washing, and base exchanging to free of alkali metals, drying, and calcining, giving rise to an amorphous silica-alumina complex, containing a small amount of chromia, and also combining a small amount of fine material of specified size and of the same composition as the finished bead derived from a prior preparation.

A more recently developed group of catalytic materials exhibiting highly desirable properties for the conversion of hydrocarbons are crystalline alumino-silicate complexes. These are materials of the general nature of zeolites, having an ordered crystalline structure, generally having been treated to substantially reduce or eliminate alkali metals, and frequently base-exchanged, as with alkaline earth compounds, or as with rare-earth compounds to incorporate at least a portion of the alkaline earth element or rare-earth element or both in the crystalline structure. One such material of this kind may be prepared by starting with the commercial material known as Linde 13X molecular sieve, treated by base exchange to incorporate rare-earth ions. Such catalysts, themselves, form no part of this invention.

These catalysts have capabilities quite different from the conventional amorphous silica-alumina complexes, as may be shown from the following data.

The data of Table I was derived from the comparison of the conventional catalyst previously spoken of and a catalyst prepared by incorporating about 7% of rare-earth exchanged 13X crystalline alumino-silicate and about 34% by weight of alumina fines in a co-gelled amorphous complex of silica-alumina. In the table, this is designated "Catalyst A."

Table I
PROPERTIES OF CATALYSTS

| | Catalyst A | Conventional |
|---|---|---|
| Physical Form | Bead | Bead |
| Surface Area, m.²/g | 132 | 85 |
| Ave. Particle Diameter, Inches | 0.140 | 0.120 |
| Density, g./cc | 0.71 | 0.78 |
| Activity Test [1]: | | |
| Gasoline, Wt. Percent Charge | 57.3 | 26.7 |
| Coke, Wt. Percent Charge | 2.0 | 1.2 |
| Gas, Wt. Percent Charge | 6.3 | 3.8 |

Table I—Continued
COMPARATIVE CRACKING
[2 LHSV Mid-Continent gas oil at 930° F. ave. reactor temp.]

| | | |
|---|---|---|
| Cat/oil Ratio Vol./Vol | 4 | 4 |
| Conv., Percent Vol | 59.2 | 41.0 |
| C₄-free Gasoline | 45.5 | 30.5 |
| Percent Vol. Charge [2] Gasoline/Conv., Percent | 76.8 | 76.0 |
| Gasoline Octane No.: | | |
| Motor (leaded) +3 ml. of TEL | 87.1 | 85.9 |
| Research (leaded) +3 ml. TEL | 97.6 | 98.6 |

[1] Light East Texas gas oil cracked over catalyst in static bed at 1.0 LHSV, 10 minutes on stream and 875° F.
[2] 356° F. at 90 percent gasoline.

As may be noted from the above, the crystalline alumino-silicate catalytic material has very significant capability increases over the conventional amorphous silica-alumina complexes.

It will also be noted that in the above the crystalline alumino-silicate material is embedded in a matrix of microporous and amorphous silica-alumina complex.

It is an object of this invention to provide an improved method for the utilization of these more active catalysts.

For an additional object there is the provision of a method for utilizing these more active catalysts in existing types of operation and existing equipment without substantial change in the physical characteristics of either.

This invention is based in part upon the fact that in an operation wherein a particle form catalyst moves cyclically through a reaction and a regeneration, such as the well known moving bed and fluidized bed operations, a very finely divided solid material added to the catalyst stream is largely deposited upon and held by the surface of the catalyst particles.

For example, in a moving bed operation utilizing "bead" catalyst, such as the "conventional catalyst" above referred to, the beads being about ⅛ inch in average diameter, if a solid material ground to particle sizes of the order of 10–15 microns be added to the catalyst stream, it will readily adhere to and coat the surface of the particles, and will be retained thereon under a wide variety of conditions for extended periods of time.

By applying this principle to the use of the crystalline alumino-silicate catalytic materials, the entire amount of the crystalline material so added is readily available for its contribution to the overall catalytic action, while the "carrier," if it be a catalyst, is still available, as usual, for its function. Since the reactants do not have to penetrate or diffuse into the amorphous matrix to reach the crystalline catalyst, its activity is not hampered by any diffusion limitations which may arise from a matrix in which it might be embedded. Further, not being embedded in a matrix, it is not competing in reaction or for reactants with a surrounding material present in much greater amount. All of these considerations imply either a greater amount of a desired reaction with the same amount of crystalline catalyst, or since these crystalline catalysts usually operate at lower temperature levels than the amorphous silica-alumina catalysts and frequently give different product distribution patterns for the same temperature, as contrasted with the amorphous materials, a new degree of control over the conversion operations may be attained.

This method of handling may be utilized with any particle-form material, whether it be beads, pellets, granules, microspheres, or the like, and in any process wherein the particle-form material moves cyclically through reaction and regeneration. It may be used upon any particle-form "carrier" whether the "carrier" itself be a catalyst for the desired operation, or some portion thereof, or be inert. It may also be used in static bed systems by pre-coating the "carrier," as by tumbling in the presence of the finely divided crystalline catalyst before loading into the reactor.

Of course, in moving catalyst systems, such as the moving bed systems, a certain amount of abrasion of the particle-form material occurs, and it is customary to remove the fines so produced by an elutriation process. In fluidized bed processes, it is usually customary to remove fines from effluent vapors and return them to the bed. In either case, it is obvious that the added crystalline materials will in part travel with and be handled with the normally appearing fines. In elutriation removal of fines the so-removed crystalline catalytic material will not be economically substantial in amount, as will be noted subsequently.

In a moving bed, or "TCC" process, of "airlift" type, having a capacity of 20,000 barrels per day of gas oil charge, the inventory of bead catalyst, such as the conventional catalyst above noted, in the operating portion of the unit is about 600 tons, circulated at a rate of about 475 tons per hour. (Dependent upon other factors, this circulation rate may vary within the range 350–550 tons per hour.) With the "conventional catalyst" above referred to a normal attrition rate of not above 1.5 tons per day is experienced, which material is removed as fines through elutriation.

The addition of crystalline catalytic material, to the extent of about 4% to 5% by weight of the total inventory, i.e., about 30 to 40 tons of the material, will result in conversions of hydrocarbons with results quite similar to those set forth in the comparison of operations set forth in Table I set forth above. Of this material, about 300 pounds per day will be lost through the elutriation operation. The remainder will remain on the bead catalyst surfaces through the cycles of reaction and regeneration.

The terms "crystalline catalytic material" and "crystalline alumino-silicate catalytic material" used herein embrace alumino-silicate materials of ordered crystalline structure and generally zeolitic nature, with definite ratios of silica and alumina, and frequently with significantly less alkali metal content than that necessary to give the "salt" form of the compound. The terms also embrace such materials in which at least a portion of the alkali metal is replaced by alkaline earth metal ions or by rare-earth ions.

The size of the powdered crystalline alumino-silicate material which is added depends upon the nature or size of the "carrier" to which it is added. In moving bed systems, which normally use beads or particles of about 0.1 inch minimum average diameter, an upper limit of size of about 15 microns is desirable beyond which the "coating" phenomenon does not occur. There is no lower size limit, since the finer the material, the better the adherence. With "carrier" particles of about 0.1 inch average diameter, a maximum powder particle size of 12 to 13 microns is desirable. Some moving bed operations use granular materials of 30–60 mesh size (60 mesh is about .246 mm.), and here particle sizes of about 10–12 microns will be found useful. In fluidized bed operations, the "carrier" particles are much smaller, of the order of 150–200 mesh (104 microns to 74 microns, approximately), and frequently of sizes down to 20 microns. Since the usual desire is to modify or assist the operation of the "carrier" particle which normally is the principal catalyst for the desired reaction, and to avoid the possibility of mechanical segregation of mixed catalyst of similar sized particles, the adherence principle should be observed. To do so in the case of the finest "carrier" particles, around 20 micron size, requires finely powdered crystalline alumino-silicate, with sizes of the order of 5 microns. In fixed bed operations, the "carrier" particle sizes are of the order of 0.1 inch (2.54 mm.) and above, and powder sizes will be about the same as for moving bed operations.

The amount of crystalline alumino-silicate catalytic material to be added depends upon the effect desired, the size of the pulverulent material, and the nature of the material to which it is added. With beads, as described, of the conventional catalyst, an upper limit of about 5% or so by weight can be reached without serious change in the flow characteristics in the moving bed operation through which the composite passes. With fluidized bed operation, it will be possible to use higher concentrations, of the order of 10% by weight. With pellet and granular "carriers" so much depends upon the sizes, shapes, and surfaces of the "carrier" material that determination of what amount can be used must be by experimentation, and the same is true for any type of "carrier" in a static bed operation, where plugging of interstices between particles becomes of major importance. In general, an upper limit of about 10% by weight of the total mass is indicated.

It is also noted that the amount to be added will vary with the purpose desired, since smaller amounts may be used to merely influence or slightly change the nature and course of a reaction being accomplished by the major catalytic portion of the composite catalyst.

The conditions of operation, i.e., catalyst/oil ratio, liquid hourly space velocity, temperature, pressure, and the like will not vary to any great degree from those utilized for conventional catalytic materials for the same desired conversions, although due to the increased activity of the crystalline alumino-silicate catalysts, it will frequently be possible to operate at somewhat lower temperatures. The amount of this modification will depend upon the proportionate amount of the crystalline catalytic material present, being greatest, of course, in those circumstances where the major catalysis emphasis is upon the crystalline material itself and that material is present in comparatively large amount.

I claim:

1. In a method for the catalytic conversion of hydrocarbons the improvement which comprises contacting the hydrocarbons at conversion conditions with a contact mass comprising two components one of which is a particle form solid material selected from the group consisting of inert material and catalytic material ranging generally from 20 microns upwardly to 0.1 inch and above, the average size of particles being dependent upon the type of process, the second component comprising a crystalline aluminosilicate conversion catalyst said second component being in the form of particles ranging downward in size from 15 microns, said second component having at least some material of not more than 5 microns in size and sufficient of said second component to substantially coat the particles of the first named component and to adhere to the surfaces of the particles of the first named component.

2. The method of claim 1 in which the second component comprises a superactive crystalline aluminosilicate.

3. The method of claim 1 in which the particle-form solid contact mass material moves as a descending bed through the area of hydrocarbon contact, said bed being replenished at the top and having portions thereof withdrawn at the bottom, with said powdered crystalline aluminosilicate conversion catalyst being added to the incoming particle-form solid contact mass material in quantity sufficient to maintain at least a partial coating thereof upon the particles in said bed.

4. The method of claim 1 in which the solid contact material particles are kept in a fluidized bed condition by the passage of hydrocarbon reactant therethrough and in which powdered aluminosilicate conversion catalyst is fed to said bed in quantity sufficient to maintain at least a partial coating thereof upon the particles in said bed.

5. The method of claim 1 in which the solid contact material particles form a fixed bed through which hydrocarbon reactant is passed, the solid contact material particles having been pre-coated at least in part with the powdered crystalline aluminosilicate conversion catalyst.

6. The method of claim 1 in which the powdered crystalline aluminosilicate conversion catalyst is present to the extent of up to about 10 percent by weight of the total contact material.

7. The method of claim 1 in which the contact mass is maintained in the form of a moving bed and the powdered crystalline aluminosilicate conversion catalyst is present to the extent of up to about 5 percent by weight of the total contact material.

References Cited by the Examiner

"Cracking Catalyst," Ryland et al., Chapter I, page 76, second paragraph in volume VII of Catalysis, Reinhold Publishing Co., 1960, New York.

ALPHONSO D. SULLIVAN, *Primary Examiner.*